US012183357B2

(12) United States Patent
Liu et al.

(10) Patent No.: US 12,183,357 B2
(45) Date of Patent: Dec. 31, 2024

(54) ENHANCING MUSICAL SOUND DURING A NETWORKED CONFERENCE

(71) Applicant: Zoom Video Communications, Inc., San Jose, CA (US)

(72) Inventors: Qiyong Liu, Cupertino, CA (US); Jiachuan Deng, Santa Clara, CA (US); Yuhui Chen, San Jose, CA (US); Oded Gal, Palo Alto, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/083,004

(22) Filed: Dec. 16, 2022

(65) Prior Publication Data

US 2023/0124470 A1  Apr. 20, 2023

Related U.S. Application Data

(63) Continuation of application No. 16/945,364, filed on Jul. 31, 2020, now Pat. No. 11,562,761.

(51) Int. Cl.
*G10L 25/81* (2013.01)
*G10L 21/02* (2013.01)
*G10L 25/30* (2013.01)
*G10L 25/51* (2013.01)

(52) U.S. Cl.
CPC ............ *G10L 21/02* (2013.01); *G10L 25/30* (2013.01); *G10L 25/51* (2013.01); *G10L 25/81* (2013.01)

(58) Field of Classification Search
CPC .......... G10L 25/81; G10L 25/51; G10L 21/02
See application file for complete search history.

(56) References Cited

U.S. PATENT DOCUMENTS

| 7,127,390 | B1 | 10/2006 | Su |
| 9,129,600 | B2* | 9/2015 | Gibbs ................... G10L 19/20 |
| 10,296,638 | B1 | 5/2019 | Chen et al. |
| 10,522,167 | B1 | 12/2019 | Ayrapetian et al. |
| 2004/0107441 | A1 | 6/2004 | Ichiyoshi |
| 2006/0012831 | A1 | 1/2006 | Narimatsu et al. |
| 2012/0158401 | A1* | 6/2012 | Mazurenko ............ G10L 25/81 704/208 |
| 2013/0195302 | A1 | 8/2013 | Meincke et al. |
| 2017/0047077 | A1 | 2/2017 | Lee et al. |
| 2017/0076734 | A1* | 3/2017 | Subasingha ............ G10L 25/81 |
| 2020/0090644 | A1 | 3/2020 | Klingler et al. |
| 2021/0201926 | A1 | 7/2021 | Stark |
| 2021/0343058 | A1 | 11/2021 | Yang et al. |
| 2022/0159403 | A1* | 5/2022 | Sporer .................. H04R 3/005 |

* cited by examiner

*Primary Examiner* — Bryan S Blankenagel
(74) *Attorney, Agent, or Firm* — Young Basile Hanlon & MacFarlane, P.C.

(57) ABSTRACT

Dynamic adjustment of audio characteristics for enhancing musical sound during a networked conference is disclosed. In an embodiment, a method is provided for sound enhancement performed by a device coupled to a network. The method includes receiving an audio signal to be transmitted over the network, detecting when musical content is present in the audio signal, processing the audio signal to enhance voice characteristics to generate an enhanced audio signal when the musical content is not detected, processing the audio signal to enhance music characteristic to generate the enhanced audio signal when the musical content is detected, and transmitting the enhanced audio signal over the network.

16 Claims, 5 Drawing Sheets

ENHANCING MUSICAL SOUND DURING A NETWORKED CONFERENCE

CROSS-REFERENCE TO RELATED APPLICATIONS

This application is a continuation of U.S. patent application Ser. No. 16/945,364, filed on Jul. 31, 2020, the contents of which are incorporated herein by reference in their entirety.

FIELD

The exemplary embodiments of the present invention relate to the field of network communication. More specifically, the exemplary embodiments of the present invention relate to adjusting audio characteristics of a networked conference.

BACKGROUND

With the increasing popularity of digital electronics and network communications, real-time interactive networked conferences have become more popular. For example, video conferencing applications allow people to communicate with each other from remote locations and exchange audio and video content in real time.

Audio sharing during a networked conference is an important feature. A meeting attendee, for example, can receive and transmit audio information with other attendees. A typical conferencing system is configured to optimize voice transmission between attendees. Thus, the system may be configured to transmit the best voice quality so that attendees can easily understand each other. However, networked conferences can transmit other types of shared sounds, such as music, which has different sound characteristics than voice. If the system is configured to optimize audio transmissions for the characteristics of voice or speech, using this same configuration to transmit other types of sounds, such as music, may result in sound quality that is less than desired.

SUMMARY

In various embodiments, a sound enhancement system (SES) is disclosed that provides enhanced sound processing for transmitting musical content during a networked conference. In one embodiment, the SES receives an audio input for transmission during a networked conference. The SES detects whether the audio input comprises musical content. For example, the audio input may comprise only speech content or may comprise some amount of musical content, such as singing, musical instruments, or computer-generated musical sounds. When musical content is detected, the SES processes the audio input to generate an enhanced audio signal that accounts for the bandwidth and particular characteristics of the musical content. The enhanced audio signal is then encoded and transmitted to other members of the networked conference. When the SES detects that the audio input comprises only voice content, the SES processes the audio input to generate the enhanced audio signal to account for the bandwidth and particular characteristics of voice content. For example, the enhanced audio signal can be generated by selectively applying noise reduction, gain adjustments, and/or echo cancellation to the audio input. Thus, the SES dynamically adapts to process the audio input to provide the best sound quality when transmitting either voice or musical content.

In an embodiment, a method is provided for sound enhancement performed by a device coupled to a network. The method includes receiving an audio signal to be transmitted over the network, detecting when musical content is present in the audio signal, processing the audio signal to enhance voice characteristics to generate an enhanced audio signal when the musical content is not detected, processing the audio signal to enhance music characteristic to generate the enhanced audio signal when the musical content is detected, and transmitting the enhanced audio signal over the network.

In an embodiment, apparatus is provided for sound enhancement. The apparatus comprises a detector that receives an audio signal to be transmitted over a network and detects when musical content is present in the audio signal. The apparatus also comprises a processor that processes the audio signal to enhance voice characteristics to generate an enhanced audio signal when the musical content is not detected, and that processes the audio signal to enhance music characteristics to generate the enhanced audio signal when the musical content is detected. The apparatus also comprises a transmitter that transmits the enhanced audio signal over the network.

In an embodiment, a non-transitory computer readable medium is provided on which are stored program instructions that, when executed by a processor, cause the processor to perform operations of: receiving an audio signal to be transmitted over a network; detecting when musical content is present in the audio signal; processing the audio signal to enhance voice characteristics to generate an enhanced audio signal when the musical content is not detected; processing the audio signal to enhance music characteristics to generate the enhanced audio signal when the musical content is detected; and transmitting the enhanced audio signal over the network.

Additional features and benefits of the exemplary embodiment(s) of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
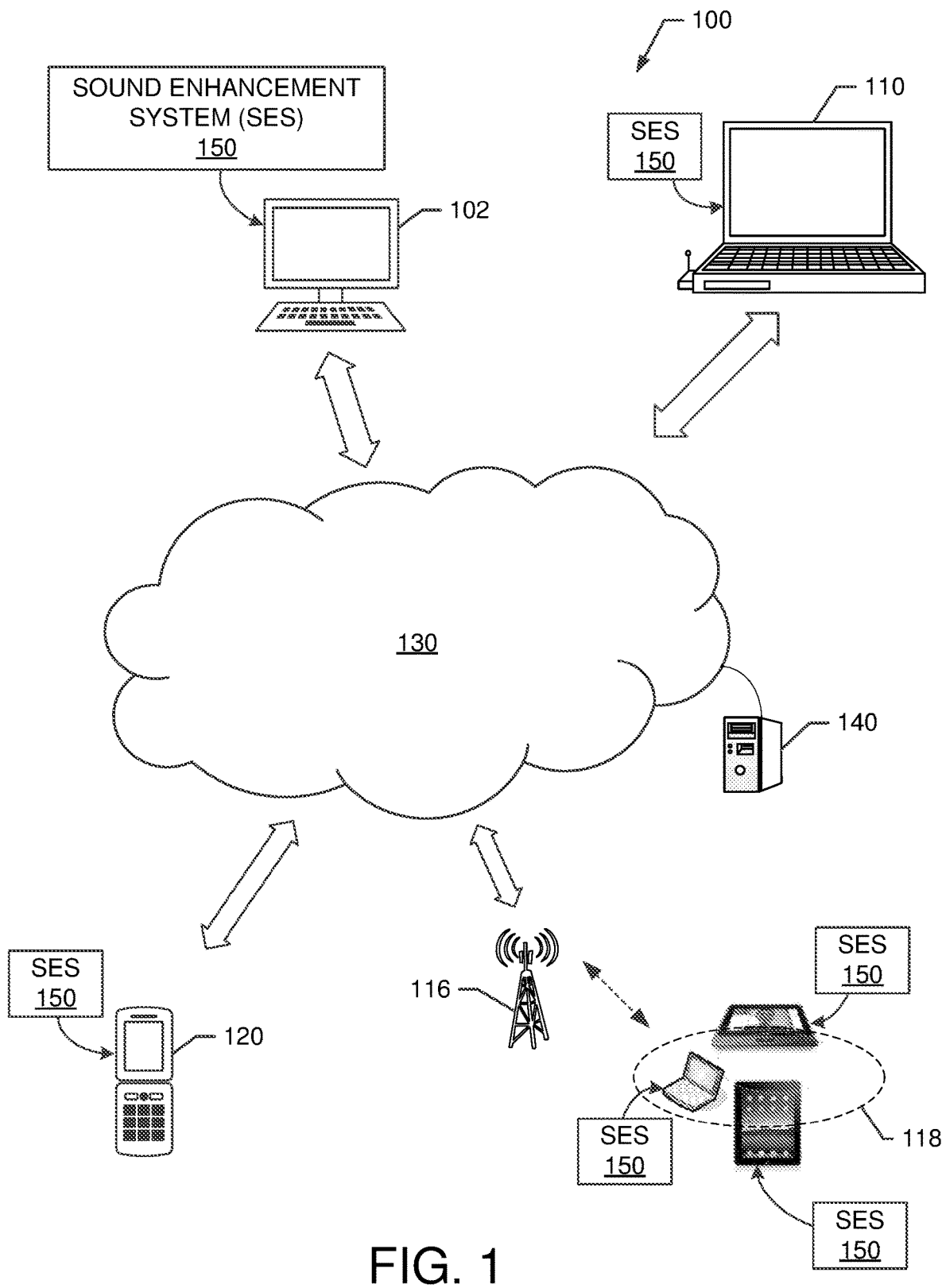
FIG. 1 shows a diagram illustrating a communication network capable of facilitating one or more interactive real-time audio/video conferences in accordance with embodiments of the present invention.

Embodiments of the present invention disclose methods and apparatus for providing enhanced musical content during online real-time interactive networked conference meetings.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram illustrating a communication network 100 capable of facilitating one or more interactive real-time audio/video networked conferences in accordance with embodiments of the present invention. The communication network 100 comprises a server computer 140 coupled to a network 130, which is also coupled to client computers 102, 110, 118, and 120 as attendee's systems or devices. Server 140, in one example, is further coupled to a group of wireless or portable devices 118 via a base station 116. In one example, server 140 may represent an instance among a large number of instances of application servers in a data center, cloud computing environment, or any other mass computing environment. There also may be included thousands or millions of client computers. It should be noted that the underlying concepts of the exemplary embodiments of the present invention would not change if one or more blocks (or systems) were added to or removed from the communication network 100.

In an embodiment, server computer 140 hosts a networked conference meeting and transmits and receives video and audio data to and from each of the client computers 102, 110, 118, and 120. Each of the client computers 102, 110, 118, and 120 includes a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 102, 110, 118, and 120 may include an integrated or separate display unit such as a computer screen, TV screen or other display. Client computers 102, 110, 118, and 120 may comprise any of mobile or stationary computers including desktop computers, laptops, netbooks, ultrabooks, tablet computers, smartphones, et cetera. It should be noted that GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 102, 110, 118, and 120 hosts, in an embodiment, an application that allows each of the client computers 102, 110, 118, and 120 to communicate with the server computer 140. In an embodiment, the server 140 may maintain a list of accounts, each associated with one of the client computers 102, 110, 118, 120 and/or one or more users of the client computers.

In one embodiment, each of the client computers 102, 110, 118, and 120 can be used by an attendee of a networked conference session. Client computers 102, 110, 118, and 120 can be simultaneously a presenter and recipient attendee of a networked conference session.

Audio Sound Enhancements

With the recent growth of networked meetings, users have started to utilize these meetings for applications beyond business meetings. For example, networked audio/video meetings are now being used to transmit music to large networked audiences. However, speech-based audio processing that is normally used for business meetings to enhance voice clarity can negatively impact musical sounds. For instance, voice-based background noise suppression may treat part of the music signal as noise and suppress it. Thus, the meeting participants that are listening to the music may hear distorted and/or unclear music sounds.

In an embodiment, transmission of musical performances, such as a symphony or other live performance, to large networked audiences can be performed using a method called "Original Sound." This method simply turns off all audio processing when transmitting the musical performance. This is helpful with musical performances because no audio processing is being performed that might distort the sound. Using this method, it is recommended to use an over the ear headset with a microphone to avoid any background noise.

In an embodiment, a sound enhancement system 150 operates to provide a more optimal solution for transmitting music and that is implemented in two parts. As illustrated in FIG. 1, the SES 150 is implemented in all of the client computers 102, 110, 118, 120. Instead of turning off all audio processing, the sound enhancement system 150 provides special audio processing technologies to optimize the networked communication for the transmission of musical sounds.

First, an audio signal to be transmitted passed through a musical content detection circuit that detects the presences of musical content. Second, when musical content is not detected, the system applies sound processing that is optimized for voice transmission. When musical content is detected, the system automatically (and dynamically) switches to music-optimized audio processing. Voice or "Speech-based" audio processing will be automatically re-enabled as soon as musical content is not detected in the audio signal. An advantage of the SES 150 is that the client computers 102, 110, 118, 120 operate to provide improved or enhanced processing and presentation of musical content, such as live performances, music clips, music sound files, YouTube, and the like, during a networked conference.

Figure 2:
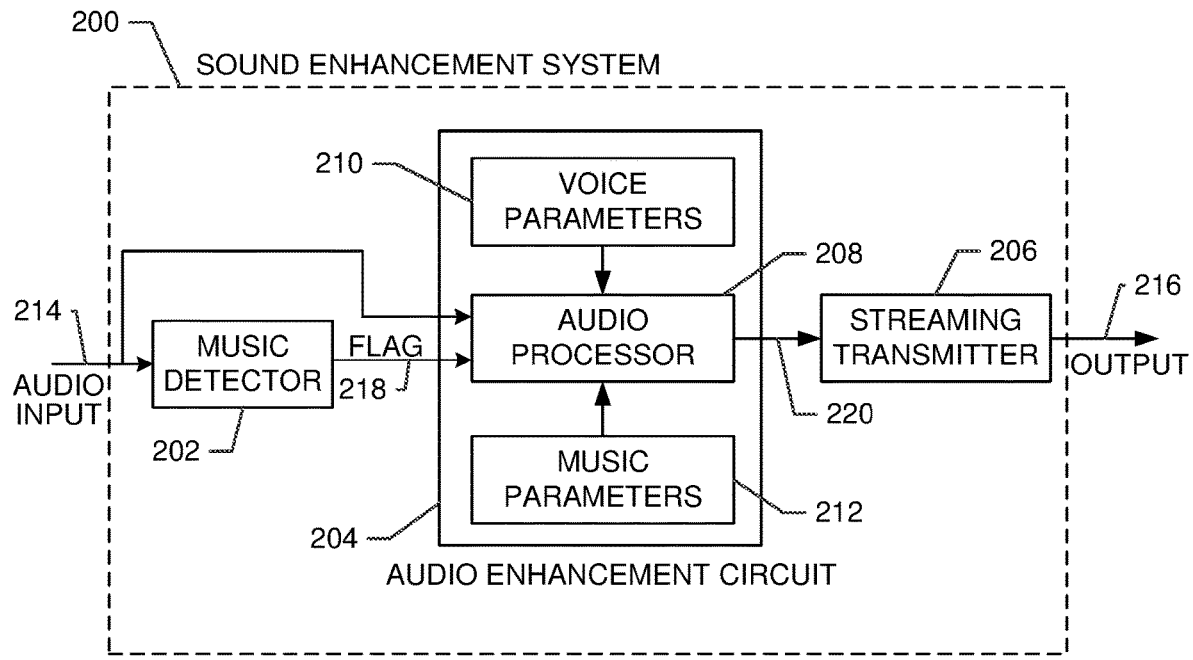
FIG. 2 shows an exemplary embodiment of a sound enhancement system (SES).

FIG. 2 shows an exemplary embodiment of a sound enhancement system (SES) 200. For example, the SES 200 is suitable for use as the SES 150 shown in FIG. 1. The SES 200 comprises music detector 202, audio enhancement circuit 204, and streaming transmitter 206. The circuit 204 comprises audio processor 208, voice parameters 210, and music parameters 212.

During operation, an audio input is received for transmission. For example, the audio input can be a voice signal of a user that is generated by a microphone. The audio input may also be a music signal that is also generated by a microphone, sound file, or other source. For example, musical sounds can be captured by a microphone to generate the audio input. In another embodiment, the audio input can be derived from a computer. For example, the audio input can be a computer file, such as a music file, or derived from streaming information, such as from a network application.

In an embodiment, the audio input 214 is input to the music detector 202, which detects the presence of musical content in the audio input. If the audio input comprises only voice content (also referred to as speech), then the music detector generates a flag 218 having a first state, such as a logic "0." If the audio input comprises musical content, such as singing, musical instruments, or computer generated musical content, then the music detector 202 generates the flag 218 to have a second state, such as a logic "1."

In an embodiment, the flag 218 and the audio input 214 are input to the audio processor 208 of the audio enhancement circuit 204. Based on the state of the flag 218, the processor 208 processes the input signal using one of two sets of parameters. If the flag 218 is in the first state (0), then the audio processor 208 processes the audio input using voice parameters 210 to generate an enhanced audio signal. If the flag 218 is in the second state (1), then the audio processor processes the audio input using music parameters 212 to generate the enhanced audio signal. Thus, based on the state of the flag 218, the audio processor 208 can dynamically switch between processing the audio input 214 as voice content (speech) and processing the audio input 214 as music content. A more detailed description of the operation of the sound enhancement system 200 is provided below.

In an embodiment, the audio processor 208 encodes the generated enhanced audio signal to generate an encoded enhanced audio signal 220. In an embodiment, the audio processor 208 encodes the enhanced audio signal using an encoding method that is also identified by the selected parameters. The encoded signal 220 is input to the stream transmitter 206, which generates an output signal 216 for transmission over a communication network. As a result, meeting attendees will receive an audio signal that has been processed to provide the best sound quality regardless of whether the audio signal comprises voice content or musical content. Thus, an advantage of employing SES 200 is that it operates to perform high-fidelity audio processing for shared audio, which improves sound quality for both music and voice signals.

In an exemplary embodiment, the sound enhancement system 200 performs voice/music adaptive audio processing for real-time networked conferencing by performing at least the following operations.

1. Obtain an audio signal for transmission. For example, the audio signal can be obtained from a microphone or computer file 2. Detect when the audio signal comprises voice content and when the audio signal comprises musical content. For example, the music detector 202 makes this determination and sets the flag 218 to a first state (0) when voice content is detected and to a second state (1) when music content is detected.

3. Perform processing of the audio signal using music parameters when the audio signal comprises musical content (i.e., flag=1) to generate an enhanced audio signal that has optimized sound quality for music. For example, the audio processor 208 performs this operation.

4. Perform processing of the audio signal using voice parameters when the audio signal comprises voice content (i.e., flag=0) to generate an enhanced audio signal that has optimized sound quality for speech. For example, the audio processor 208 performs this operation.

5. Encode the enhanced audio signal with an associated encoder or encoding process. For example, the audio processor 208 performs this operation and determines the encoding process from either the voice parameters 210 or the music parameters 212.

6. Transmit the encoded enhanced audio signal over a communication network. For example, the streaming transmitter 206 performs this operation. The streaming transmitter 206 is configured to stream the encoded enhanced audio signal over a network connection to other networked entities or users using any appropriate network protocol.

A more detailed description of the implementation and operation of the sound enhancement system 200 is provided below.

Figure 3:
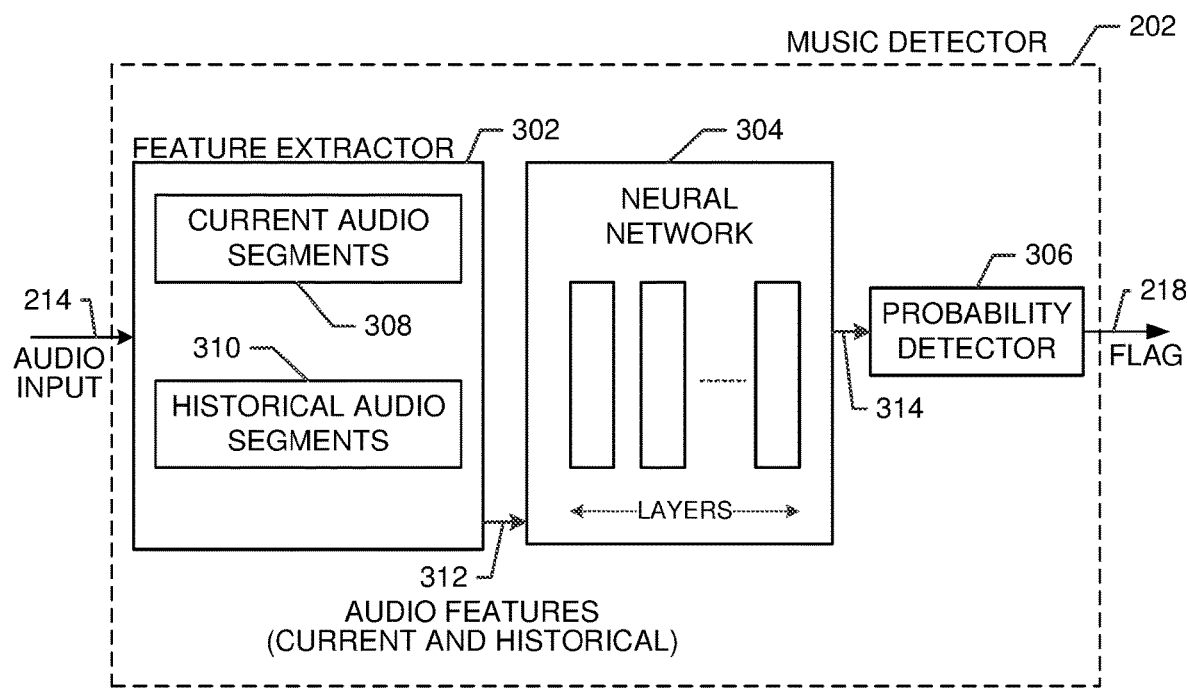
FIG. 3 shows an exemplary detailed embodiment of a music detector illustrated in FIG. 2.

FIG. 3 shows an exemplary detailed embodiment of the music detector 202 illustrated in FIG. 2. In an embodiment, the music detector 202 comprises a feature extractor 302, neural network 304, and probability detector 306.

In an exemplary embodiment, the music detector 202 is configured to analyze audio features 312 determined from short (usually 500 milliseconds) audio segments (current audio segments 308) and historical audio segments 310. The feature analysis is performed by an artificial intelligence (AI) based neural network 304 comprising one or multiple neural network layers, such as Fully Connected layers, Convolutional layers, and/or Long short-term memory layers. In an embodiment, the neural network 304 is trained to perform the functions described herein.

In an exemplary embodiment, the audio signal 214 is input to the feature extractor 302, which extracts audio features 312 (for example, Mel Frequency Cepstral Coefficients (MFCCs)) from the current audio segment 308 and the historical audio segment 310. The audio features 312 (current and historical) are then input to the neural network 304.

In an exemplary embodiment, the neural network 304 processes the features 312 and outputs a probability indicator 314 of the current audio segment 308 containing musical content expressed in a 0-1 scale. In an embodiment, the probability detector 306 receives the probability indicator 314 and performs post processing strategies to remove outliers and to further map the probability indicator 314 to the binary flag 218 where: 0 stands for the current audio segment 308 is in a non-music scenario; and 1 stands for the current audio segment 308 is in a music scenario. The flag 218 is input to the audio processor 208 shown in FIG. 2.

Figure 4:
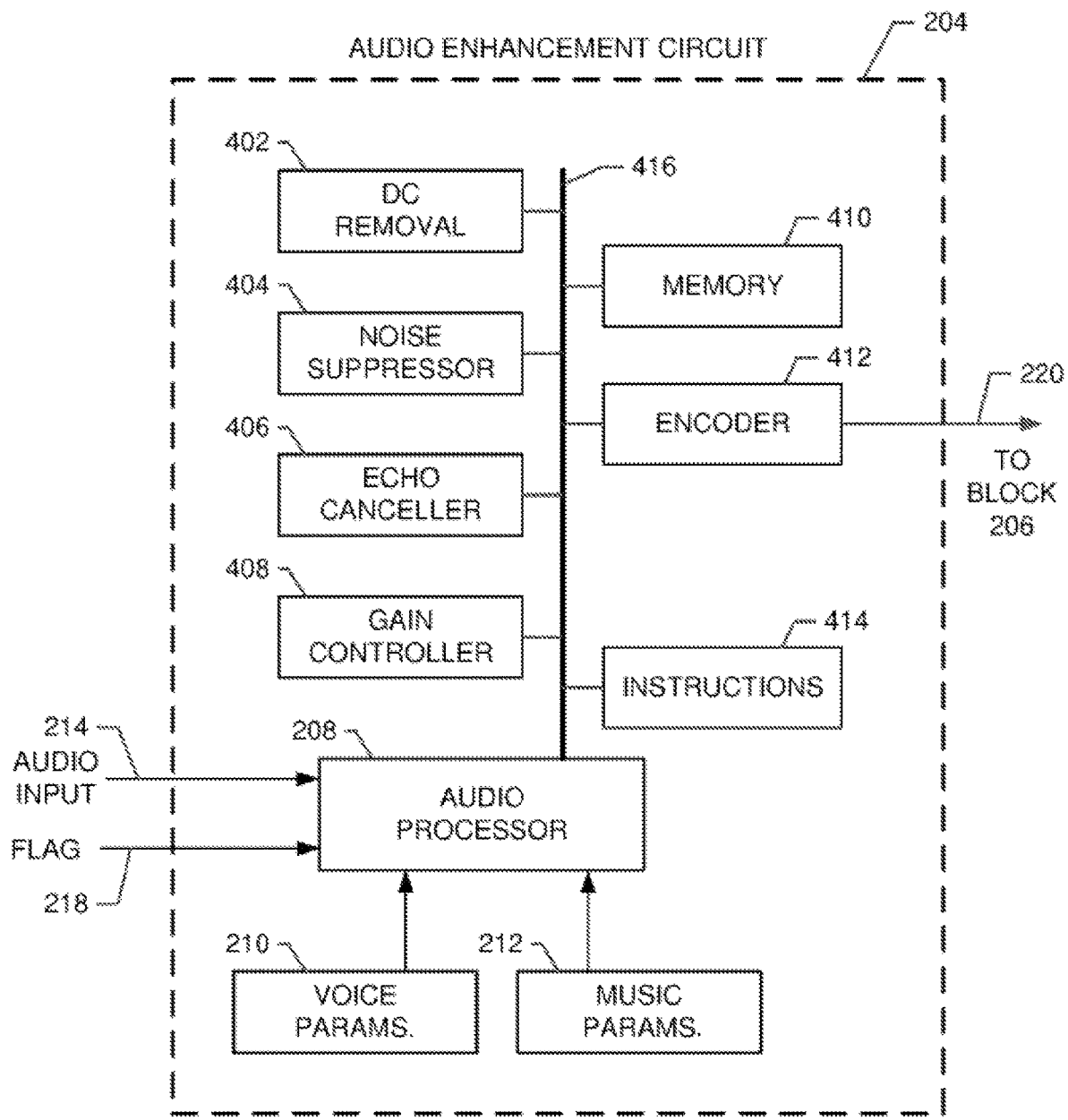
FIG. 4 shows an exemplary detailed embodiment of an audio enhancement circuit illustrated in FIG. 2.

FIG. 4 shows an exemplary detailed embodiment of the audio enhancement circuit 204 illustrated in FIG. 2. In an embodiment, the circuit 204 comprises audio processor 208, voice parameters 210, and music parameters 212. The circuit 204 also comprises DC removal circuit 402, noise suppressor 404, echo canceller 406, gain controller 408, memory 410, encoder 412 and instruction memory 414, all coupled to communicate with the processor 208 over bus 416.

In real-time end-to-end audio communications, traditional audio processing and encoding is designed for speech signals to transmit in a low-bitrate network condition. For example, audio processing is performed to improve speech clarity and typically includes gain control to adapt to various audio levels, noise suppression to cancel background noise, and echo cancellation to remove echo.

In an embodiment, the audio signal 214 and the flag 218 are input to the audio processor 208 of the audio enhancement circuit 204. Based on the state of the flag 218, the audio processor 208 retrieves either the voice parameters 210, or the music parameters 212. The retrieved parameters are used to process the audio input 214 to generate the enhanced audio signal. For example, the processor 208 uses the retrieved parameters to control the operation of the DC removal circuit 402, noise suppressor 404, echo canceller 406, and gain controller 408 to process the audio input to generate the enhanced audio signal. It should be noted that the processor 208 can control the order in which the functions of the enhancement circuit 204 are performed so that the functions can be performed in any desired sequence and so that the output of any particular function can be used as input to any other function. The processor 208 also uses the retrieved parameters to control the operation of the encoder 412 to encode the enhanced audio signal to generate the encoded signal 220.

In an exemplary embodiment, the processor 208 provides a degree of hysteresis so that changes in the state of the flag 218 are not immediately acted on. For example, the processor 208 monitors the state of the flag 218 for a selected time interval before determining that the flag 218 has changed state. The hysteresis prevents the processor 208 from continuously changing the audio processing operations in cases where the flag 218 changes state often in a short time interval.

In an exemplary embodiment, the audio processor 208 executes instructions 414 to perform the operations described herein. For example, the processor 208 executes the instructions 414 to control the operation of the DC removal circuit 402 to remove DC, noise suppressor 404 to suppress noise, the echo canceller 406 to remove echo, the gain controller 408 to adjust signal gain, and encoder 412 to encode the enhanced audio signal. In another embodiment, the functions of one or more of the DC removal circuit 402, noise suppressor 404, echo canceller 406, gain controller 408, and encoder 412 are integrated and performed by the processor 208. In another embodiment, the functions of the audio enhancement circuit 204 are embodied in a gate array, programmable logic, or state machine. Thus, the functions of the audio enhancement circuit 204 can be implemented in a variety of ways.

Processing for Voice Content (Speech)

In an exemplary embodiment, the voice parameters 210 indicate the audio processing performed by the processor 208 when the audio input 214 is determined to be voice content based on the state of the flag 218. For example, the voice parameters 210 indicate that the processor 208 should control the gain controller 408 to adjust the amount of gain applied to the audio input 214. This gain is updated adaptively based on the input signal level. A more detailed description of the implementation and operation of the gain controller 408 is provided below.

In an embodiment, the voice parameters 210 indicate that the audio processor 208 should control the noise suppressor 404 to perform a non-linear gain function across frequencies to suppress the stationary background noise. A more detailed description of the implementation and operation of the noise suppressor 404 is provided below.

In an embodiment, the voice parameters 210 indicate that the audio processor 208 should control the echo canceller 406 to perform linear processing to reduce the fixed acoustic echo path and non-linear processing to eliminate residuals on the audio signal.

In an embodiment, the voice parameters 210 indicate that the audio processor 208 should control the encoder 412 to use a codec identified in the voice parameters 210 that is designed for speech.

In an exemplary embodiment, the voice parameters 210 comprise the following parameters that are designed to control processing of the speech input to generate the enhanced audio signal.

DC removal: (on/off)
Noise suppression: (on/off)
Echo Canceller: (on/off)
Gain Controller: (gain level)
Encoder: (Codec: OPUS, Channel: mono, Bitrate: <40 kbps, Sampling rate: 16/24 khz.

Processing for Musical Content

In an exemplary embodiment, the audio processor 208 operates to perform the following functions when the flag 218 indicates that the audio input 214 comprises musical content. The audio processor 208 retrieves the music parameters 212 and uses the parameters 212 to control the DC removal circuit 402, noise suppressor 404, echo canceller 406, gain controller 408, and encoder 412, which are optimized to process musical content. In an embodiment, the music parameters 212 indicate that the audio processor 208 should completely disable any audio processing to preserve details of the music. This configuration can be used for a musical performance so that all musical characteristics can be preserved. In another embodiment, the music parameters 212 indicate that the audio processor 208 should perform audio processing that is optimized for music or musical sounds to minimize distortion of the musical content in the audio signal 214.

In an embodiment, the music parameters 212 indicate that the audio processor 208 should control the noise suppressor 404 to disable or only estimate and remove the most stable part of stationary background noise.

In an embodiment, the music parameters 212 indicate that the audio processor 208 should control the echo canceller 406 to disable or only cancel echo using a linear filter.

In an embodiment, the music parameters 212 indicate that the audio processor 208 should control the gain controller 408 to completely disable gain control, or maintain minimum audio gain unchanged to preserve energy fluctuation natural to the music signal. In an embodiment, a speech activity detector, level estimator, and gain adjustment functions that are part of the gain controller 408 (see below) are disabled during music processing.

In an embodiment, the music parameters 212 indicate that the audio processor 208 should control the encoder 412 to use a codec identified in the music parameters 212 that is designed for music.

In an exemplary embodiment, the music parameters 212 comprise the following codec parameters that are designed to optimize music encoding.

DC removal: (on/off)
Noise suppression: (off/minimum)
Echo Canceller: (off/minimum)
Gain Controller: (off/minimum)
Encoder: (Codec: OPUS, Channel: stereo, Bitrate: >128 kbps, Sampling rate: 44.1/48 khz.

Figure 5:
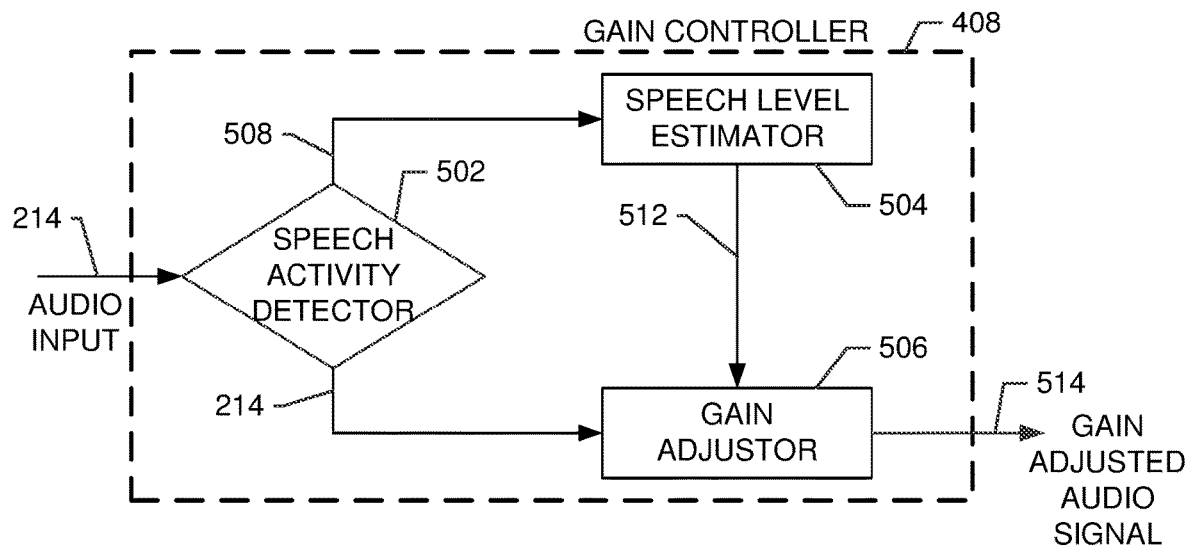
FIG. 5 shows an exemplary detailed embodiment of a gain controller illustrated in FIG. 4.

FIG. 5 shows an exemplary detailed embodiment of the gain controller 408 illustrated in FIG. 4. In an embodiment, the gain controller 408 comprises speech activity detector 502, speech level estimator 504, and gain adjustor 506. In an embodiment, the gain controller 408 is integrated into a single device, such as a gate array or programmable logic device.

In an embodiment, the speech level of the audio input 214 is determined by the speech activity detector 502 and speech level estimator 504. The speech activity detector 502 can be implemented using a variety of features, such as harmonicity or signal-to-noise ratio, with or without a machine learning based classification model. The speech level estimator 504 can be implemented using a statistical model based method or recursive averaging method to calculate the average level of the speech level.

In an embodiment, the detector 502 outputs the detected activity 508 to the speech level estimator 504. The speech level estimator 504 outputs a speech level estimate 512 to the gain adjustor 506. The gain adjustor 506 receives the audio input 214 and adjusts the gain of the audio input 214 based on the speech level estimate 512 to generate a gain adjusted audio signal 514.

Figure 6:
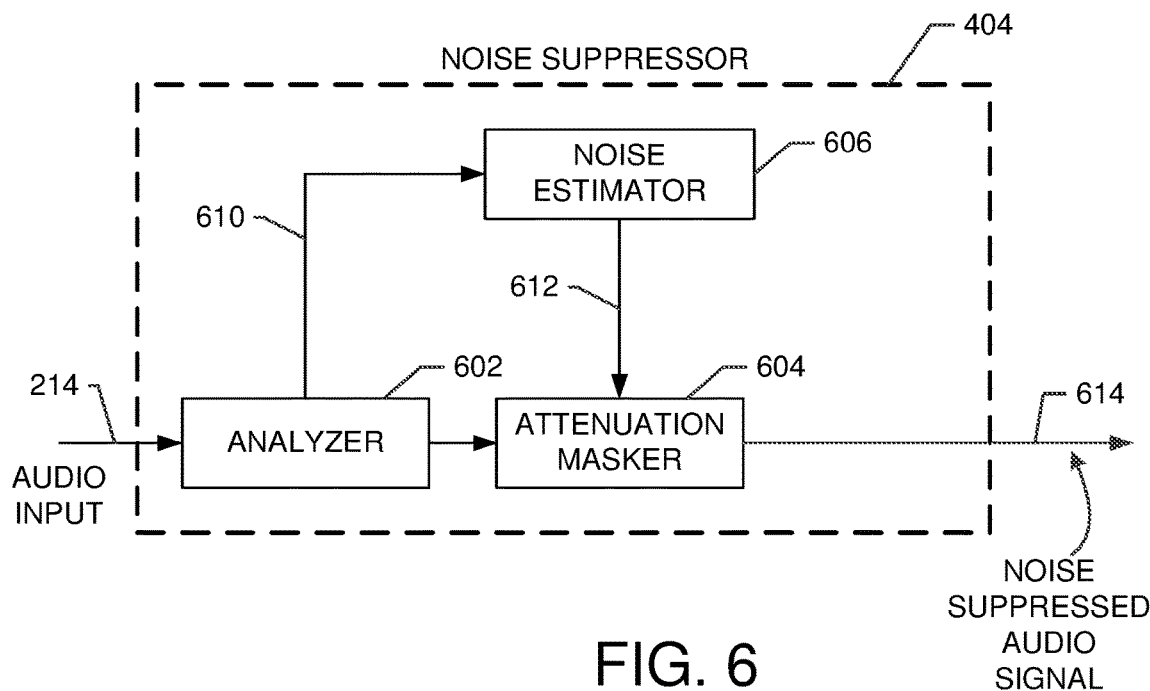
FIG. 6 shows an exemplary detailed embodiment of a noise suppressor illustrated in FIG. 4.

FIG. 6 shows an exemplary detailed embodiment of the noise suppressor 404 illustrated in FIG. 4. In an embodiment, the noise suppressor 404 comprises analyzer 602, attenuation masker 604, and noise estimator 606.

In an embodiment, the analyzer 602 analyzes the audio input 214 to determine noise information and generates an analyzed output 610 that is input to the noise estimator 608. The noise estimator 608 estimates the noise levels of the analyzed output 610 and generates a noise power estimate 612 that is input to the attenuation masker 604. The attenuation masker 604 performs an algorithm that subtracts estimated noise 612 from the input signal to generate a noise suppressed output audio signal 614.

Figure 7:
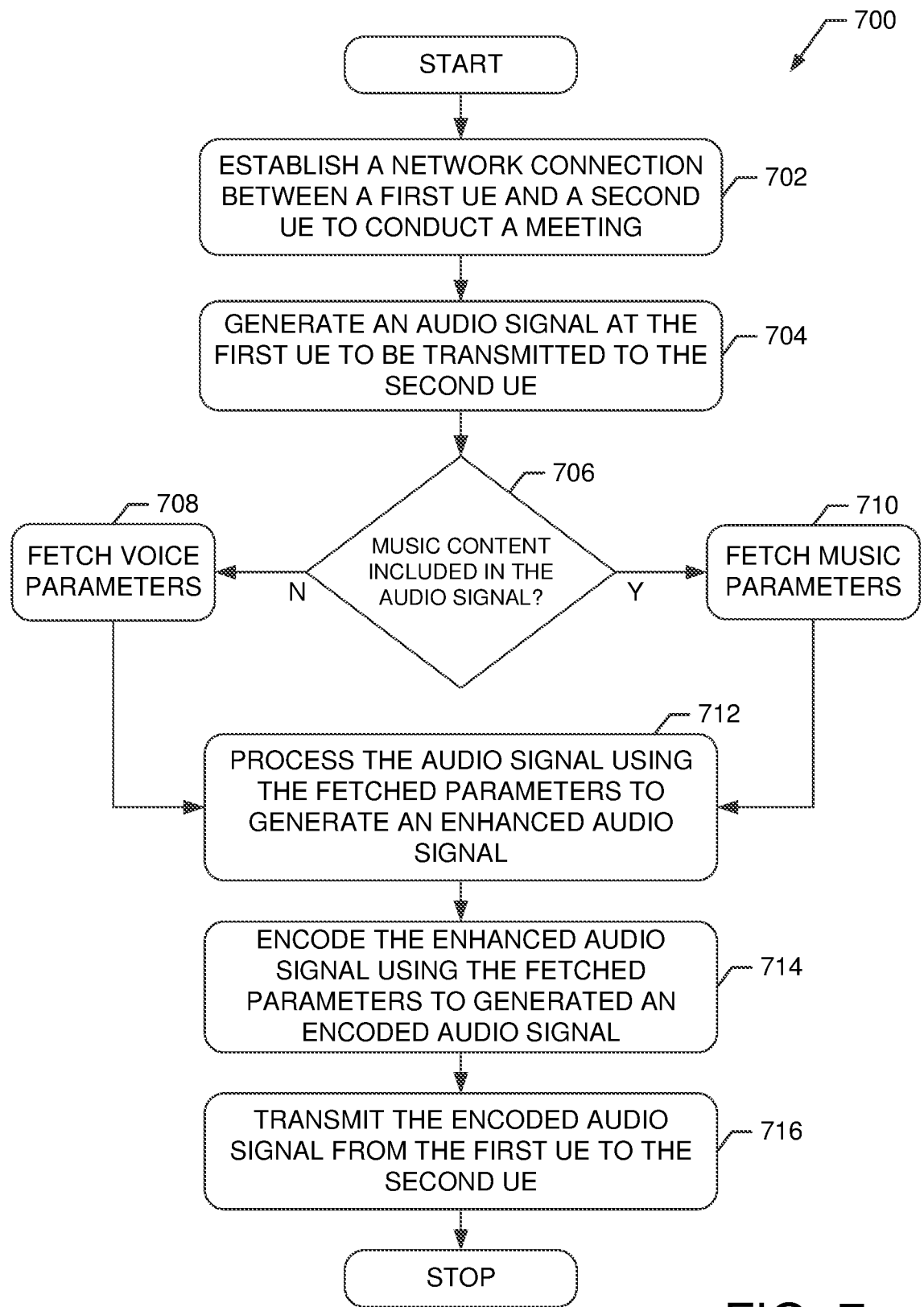
FIG. 7 shows an exemplary method for enhancing musical sound during a networked conference.

FIG. 7 shows an exemplary method 700 for enhancing musical sound during a networked conference. For example, the method 700 is suitable for use with the SES 200 shown in FIG. 2.

At block 702, a network connection for facilitating a real-time audio/video networked conference with enhanced musical sound quality is established between a first client system and a second client system. For example, multiple systems and/or portable devices situated in different geographical locations are linked via a communications network for a real-time interactive networked conference as illustrated in FIG. 1.

At block 704, an audio signal is generated at the first UE for transmission to the second UE. For example, the audio input 214 is generated to comprise voice and/or musical content.

At block 706, a determination is made as to whether there is music content in the audio signal. For example, the music detector 202 detects if musical content is carried in the audio input 214. If there is no music content in the audio signal (i.e., flag 218=0), the method proceeds to block 708. If there is music content in the audio signal (i.e., flag 218=1), the method proceeds to block 710.

At block 708, voice parameter data is fetched. For example, the audio processor 208 decodes the flag 218 and determined that the flag 218 is 0. In response, the audio processor 208 retrieves the voice parameters 210.

At block 710, music parameter data is fetched. For example, the audio processor 208 decodes the flag 218 and determined that the flag 218 is 1. In response, the audio processor 208 retrieves the music parameters 212.

At block 712, the audio signal is processed using the fetched parameters to generate an enhanced audio signal. For example, the audio processor 208 uses the retrieved parameters to control the operation of the DC removal circuit 402, noise suppressor 404, echo canceller 406, gain controller 408, and encoder 412. The audio processor 208 controls the above functions to be performed in any desired order and wherein an output from one function can be used as an input to another function.

At block 714, the enhanced audio signal is encoded for transmission. For example, the audio processor 208 uses the retrieved parameters to control the operation of the encoder 412. For example, the audio processor 208 controls the encoder 412 to encode the enhanced audio signal according to the encoding configurations described above.

At block 716, the encoded audio signal is transmitted over the network connection from the first UE to the second UE. For example the streaming transmitter 206 transmits the encoded enhanced audio signal as part of a networked conference using any suitable network protocol.

Thus, the method 700 operates to enhance musical sound during a networked conference. It should be noted that the operations of the method 700 are exemplary and not limiting of the scope of the embodiments. Furthermore the operations of the method 700 can be changed, deleted, rearranges, added to, or otherwise modified within the scope of the embodiments.

In an embodiment, the SES 200 may implement the functions described herein using customized hard-wired logic, one or more ASICs or FPGAs, firmware and/or program logic which in combination with the computer system causes or programs the SES 200 to be a special-purpose machine. According to one embodiment, the techniques herein are performed by the SES 200 in response to processor 208 executing one or more sequences of one or more instructions 414. Such instructions may be read into a memory from another storage medium. Execution of the sequences of instructions 414 causes processor 208 to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as storage device 414. Volatile media includes dynamic memory, such as main memory 410. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 416. Transmission media can also take the form of acoustic or light waves, such as those generated during radio-wave and infra-red data communications.

Various forms of media may be involved in carrying one or more sequences of one or more instructions to processor 208 for execution. For example, the instructions may initially be carried on a magnetic disk or a solid-state drive of a remote computer. The remote computer can load the instructions into its dynamic memory and send the instructions over a telephone line using a modem. A modem local to SES 200 can receive the data on the telephone line and use an infra-red transmitter to convert the data to an infra-red signal. An infra-red detector can receive the data carried in the infra-red signal and appropriate circuitry can place the data on bus 416. Bus 416 carries the data to memory 414, from which processor 208 retrieves and executes the instructions. The instructions received by memory 414 may optionally be stored on a storage device either before or after execution by processor 208.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from the exemplary embodiments of the present invention and its broader aspects. Therefore, the appended claims are intended to encompass within their scope all such changes and modifications as are within the true spirit and scope of these exemplary embodiments of the present invention.

What is claimed is:

1. A computer implemented method comprising:
   determining presence of an occurrence of a first type of content in a first portion of audio data of an audio signal associated with a virtual meeting;
   in response to determining the presence of the occurrence of the first type of content in the first portion of the audio data, setting a state flag to a first state corresponding to a hysteresis wait time interval;
   in response to setting the state flag to the first state, initiating an instance of the hysteresis wait time interval;
   detecting expiration of the instance of the hysteresis wait time interval;
   analyzing audio features of the first portion of the audio data to obtain a probability that the first portion of the audio data includes musical content, wherein the analyzing is performed by an artificial intelligence (AI) based neural network trained on historical audio segments;
   determining, once the instance of the hysteresis wait time interval has expired, that the probability that the first portion of the audio data includes musical content is equal to or above a threshold; and
   applying a first set of signal processing parameters to the audio signal comprising:
   disabling noise suppression for the audio signal;
   applying a linear filter to cancel echo for the audio signal;
   disabling gain control for the audio signal; and
   encoding the audio signal using a codec designed for music.

2. The computer implemented method of claim 1, comprising:
   determining that a second portion of the audio data includes an occurrence of a second type of content;
   in response to determining the presence of the occurrence of the second type of content in the second portion of the audio data, setting the state flag to a second state corresponding to the hysteresis wait time interval;
   in response to setting the state flag to the second state, initiating a second instance of the hysteresis wait time interval;
   detecting expiration of the second instance of the hysteresis wait time interval;
   determining, once the second instance of the hysteresis wait time interval has expired, that a probability that the second portion of the audio data includes musical content is below the threshold; and
   applying a second set of signal processing parameters to the audio signal comprising:
   applying adaptive gain control based on an input signal level for the audio signal;
   performing a non-linear gain function across frequencies to suppress stationary background noise for the audio signal;
   performing linear processing to reduce fixed acoustic echo path for the audio signal;
   performing non-linear processing to estimate residuals for the audio signal; and encoding the audio signal using a codec designed for speech.

3. The computer implemented method of claim 2, wherein the first type of content is voice content and the second type of content is musical content.

4. The computer implemented method of claim 3, further comprising enhancing one or more characteristics of the second portion of the audio data by performing at least one of: DC removal, noise suppression, echo cancellation, gain control, and encoding on the second portion of the audio data based on parameters of the musical content.

5. The method of claim 4, wherein the audio signal encoded using the codec designed for speech and the audio signal encoded using the codec designed for music are transmitted to the virtual meeting at their respective times.

6. The method of claim 3, wherein music enhanced audio data is generated by retrieving music parameters that identify processing for the second portion of the audio data.

7. The method of claim 2, wherein music enhanced audio data is generated when the first set of signal processing parameters are applied.

8. The method of claim 1, comprising:
transmitting the audio signal with the first set of signal processing parameters applied to the virtual meeting.

9. A non-transitory computer-readable medium having a computer-readable program code embodied therein to be executed by one or more processors, the program code including instructions for:
determining presence of an occurrence of a first type of content in a first portion of audio data of an audio signal associated with a virtual meeting;
in response to determining the presence of the occurrence of the first type of content in the first portion of the audio data, setting a state flag to a first state corresponding to a hysteresis wait time interval;
in response to setting the state flag to the first state, initiating an instance of the hysteresis wait time interval;
detecting expiration of the instance of the hysteresis wait time interval;
analyzing audio features of the first portion of the audio data to obtain a probability that the first portion of the audio data includes musical content, wherein the analyzing is performed by an artificial intelligence (AI) based neural network trained on historical audio segments;
determining, once the instance of the hysteresis wait time interval has expired, that the probability that the first portion of the audio data includes musical content is equal to or above a threshold; and
applying a first set of signal processing parameters to the audio signal comprising:
disabling noise suppression for the audio signal;
applying a linear filter to cancel echo for the audio signal; and
disabling gain control for the audio signal; and
encoding the audio signal using a codec designed for music.

10. The non-transitory computer-readable medium of claim 9, the program code further including instructions for:
determining that a second portion of the audio data includes an occurrence of a second type of content;
in response to determining the presence of the occurrence of the second type of content in the second portion of the audio data, setting the state flag to a second state corresponding to the hysteresis wait time interval;
in response to setting the state flag to the second state, initiating a second instance of the hysteresis wait time interval;
detecting expiration of the second instance of the hysteresis wait time interval;
determining, once the second instance of the hysteresis wait time interval has expired, that a probability that the second portion of the audio data includes musical content is below the threshold; and
applying a second set of signal processing parameters to the audio signal comprising:
applying adaptive gain control based on an input signal level for the audio signal;
performing a non-linear gain function across frequencies to suppress stationary background noise for the audio signal;
performing linear processing to reduce fixed acoustic echo path for the audio signal;
performing non-linear processing to estimate residuals for the audio signal;
and
encoding the audio signal using a codec designed for speech.

11. The non-transitory computer-readable medium of claim 10, wherein the first type of content is voice content and the second type of content is musical content.

12. The non-transitory computer-readable medium of claim 11, the program code further including instructions for enhancing one or more characteristics of the second portion by
performing at least one of: DC removal, noise suppression, echo cancellation, gain control, and encoding on the second portion of the audio data based on parameters of the musical content.

13. A communication system comprising one or more processors configured to perform operations of:
determining presence of an occurrence of a first type of content in a first portion of audio data of an audio signal associated with a virtual meeting;
in response to determining the presence of the occurrence of the first type of content in the first portion of the audio data, setting a state flag to a first state corresponding to a hysteresis wait time interval;
in response to setting the state flag to the first state, initiating an instance of the hysteresis wait time interval;
detecting expiration of the instance of the hysteresis wait time interval;
analyzing audio features of the first portion of the audio data to obtain a probability that the first portion of the audio data includes musical content, wherein the analyzing is performed by an artificial intelligence (AI) based neural network trained on historical audio segments;
determining, once the instance of the hysteresis wait time interval has expired, that the probability that the first portion of the audio data includes musical content is equal to or above a threshold; and
applying a first set of signal processing parameters to the audio signal comprising:
disabling noise suppression for the audio signal;
applying a linear filter to cancel echo for the audio signal;
disabling gain control for the audio signal; and
encoding the audio signal using a codec designed for music.

14. The communication system of claim 13, wherein the one or more processors are further configured to perform operations of:
- determining that a second portion of the audio data includes an occurrence of a second type of content;
- in response to determining the presence of the occurrence of the second type of content in the second portion of the audio data, setting the state flag to a second state corresponding to the hysteresis wait time interval;
- in response to setting the state flag to the second state, initiating a second instance of the hysteresis wait time interval;
- detecting expiration of the second instance of the hysteresis wait time interval;
- determining, once the second instance of the hysteresis wait time interval has expired, that a probability that the second portion of the audio data includes musical content is below the threshold; and
- applying a second set of signal processing parameters to the audio signal comprising:
- applying adaptive gain control based on an input signal level for the audio signal;
- performing a non-linear gain function across frequencies to suppress stationary background noise for the audio signal;
- performing linear processing to reduce fixed acoustic echo path for the audio signal;
- performing non-linear processing to estimate residuals for the audio signal; and
- encoding the audio signal using a codec designed for speech.

15. The communication system of claim 14, wherein the first type of content is voice content and the second type of content is musical content.

16. The communication system of claim 15, wherein the one or more processors are further configured to perform operations of
- enhancing one or more characteristics of the second portion by
- performing at least one of: DC removal, noise suppression, echo cancellation, gain control, and encoding on the second portion of the audio data based on parameters of the second type of content.

* * * * *